United States Patent
Koshiol et al.

(10) Patent No.: US 11,862,804 B2
(45) Date of Patent: Jan. 2, 2024

(54) OPEN TUBE BATTERY HOUSING

(71) Applicant: Cardiac Pacemakers, Inc., St. Paul, MN (US)

(72) Inventors: Kurt E. Koshiol, Minnetonka, MN (US); Benjamin J. Haasl, Forest Lake, MN (US); Joseph Charles Delmedico, Lino Lakes, MN (US); Aaron Peter Brooks, St. Paul, MN (US); Steven Lawrence Frandrup, Cottage Grove, MN (US); Andrew Dauwalter, Waconia, MN (US); Keith R. Maile, New Brighton, MN (US); Ignacio Chi, Mahtomedi, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

(21) Appl. No.: 17/889,207

(22) Filed: Aug. 16, 2022

(65) Prior Publication Data
US 2022/0393273 A1    Dec. 8, 2022

Related U.S. Application Data

(62) Division of application No. 16/564,996, filed on Sep. 9, 2019, now Pat. No. 11,450,909.
(Continued)

(51) Int. Cl.
*H01M 50/107* (2021.01)
*H01M 50/466* (2021.01)
(Continued)

(52) U.S. Cl.
CPC ....... *H01M 50/107* (2021.01); *H01M 50/147* (2021.01); *H01M 50/172* (2021.01);
(Continued)

(58) Field of Classification Search
CPC ............ H01M 50/107; H01M 50/147; H01M 50/172; H01M 50/466; H01M 50/543;
(Continued)

(56) References Cited

U.S. PATENT DOCUMENTS

| 3,503,807 A | 3/1970 | Tudorab |
| 3,655,452 A | 4/1972 | Cich |

(Continued)

FOREIGN PATENT DOCUMENTS

| CN | 100433409 C | 11/2008 |
| CN | 103180997 B | 12/2015 |

(Continued)

OTHER PUBLICATIONS

"U.S. Appl. No. 16/564,996, Advisory Action dated Oct. 22, 2021", 3 pgs.

(Continued)

*Primary Examiner* — Matthew W Van Oudenaren
(74) *Attorney, Agent, or Firm* — Schwegman Lundberg & Woessner, P.A.

(57) ABSTRACT

A battery includes a battery case including a housing having side walls defining a first open end and a second open end, the battery case including a separate top cover to cover the first open end of the housing and a separate bottom cover to cover the second open end of the housing; a first electrode located within the case; a second electrode located within the case; a first terminal coupled to the first electrode and exposed outside the case; and a second terminal coupled to the second electrode and exposed outside the case.

8 Claims, 7 Drawing Sheets

Related U.S. Application Data

(60) Provisional application No. 62/730,029, filed on Sep. 12, 2018.

(51) Int. Cl.
| | |
|---|---|
| *H01M 50/543* | (2021.01) |
| *H01M 50/172* | (2021.01) |
| *H01M 50/147* | (2021.01) |
| *H01M 4/38* | (2006.01) |
| *H01M 50/148* | (2021.01) |
| *H01M 4/08* | (2006.01) |
| *H01M 50/179* | (2021.01) |
| *H01M 50/55* | (2021.01) |
| *H01M 50/559* | (2021.01) |
| *H01M 4/12* | (2006.01) |
| *H01M 50/174* | (2021.01) |
| *H01M 4/04* | (2006.01) |
| *H01M 50/548* | (2021.01) |
| *H01M 50/124* | (2021.01) |
| *H01M 50/469* | (2021.01) |
| *H01M 4/76* | (2006.01) |
| *H01M 10/04* | (2006.01) |
| *H01M 50/152* | (2021.01) |

(52) U.S. Cl.
CPC ....... *H01M 50/466* (2021.01); *H01M 50/543* (2021.01); *H01M 4/0404* (2013.01); *H01M 4/0409* (2013.01); *H01M 4/0473* (2013.01); *H01M 4/08* (2013.01); *H01M 4/12* (2013.01); *H01M 4/382* (2013.01); *H01M 4/76* (2013.01); *H01M 10/049* (2013.01); *H01M 50/1243* (2021.01); *H01M 50/152* (2021.01); *H01M 50/154* (2021.01); *H01M 50/179* (2021.01); *H01M 50/182* (2021.01); *H01M 50/469* (2021.01); *H01M 50/548* (2021.01); *H01M 50/55* (2021.01); *H01M 50/559* (2021.01); *H01M 2220/30* (2013.01)

(58) Field of Classification Search
CPC ............. H01M 50/154; H01M 50/179; H01M 50/182; H01M 50/55; H01M 50/559; H01M 50/10; H01M 50/102; H01M 50/103; H01M 50/105; H01M 50/109; H01M 50/11; H01M 50/14; H01M 50/141; H01M 50/143; H01M 50/145; H01M 50/1243; H01M 50/152; H01M 50/15; H01M 50/153; H01M 50/176; H01M 50/181; H01M 50/463; H01M 50/469; H01M 50/545; H01M 50/56; H01M 50/548; H01M 4/0409; H01M 4/08; H01M 4/12; H01M 4/382; H01M 4/0404; H01M 4/0423; H01M 4/0426; H01M 4/0473; H01M 4/0476; H01M 4/0478; H01M 4/048; H01M 4/13; H01M 4/134; H01M 4/1395; H01M 4/366; H01M 4/405; H01M 4/76; H01M 4/765; H01M 4/70; H01M 2220/30; H01M 2004/027; H01M 10/0422; H01M 10/0431; H01M 10/0454; H01M 10/049; H01M 10/0587

See application file for complete search history.

(56) References Cited

U.S. PATENT DOCUMENTS

| | | |
|---|---|---|
| 4,263,378 A | 4/1981 | Feiman et al. |
| 7,108,166 B2 | 9/2006 | Tsukamoto |
| 9,059,435 B2 | 6/2015 | Scott et al. |
| 11,450,909 B2 | 9/2022 | Koshiol et al. |
| 2002/0155350 A1 | 10/2002 | Spillman |
| 2005/0175902 A1 | 8/2005 | Parsian |
| 2007/0009789 A1* | 1/2007 | Moceri ............... H01M 50/538 29/623.2 |
| 2007/0141449 A1 | 6/2007 | Kim |
| 2008/0085449 A1 | 4/2008 | Pyszczek et al. |
| 2008/0085451 A1* | 4/2008 | Freitag .................. H01M 4/382 29/623.2 |
| 2009/0011286 A1 | 1/2009 | Liu |
| 2010/0304209 A1* | 12/2010 | Lund ................... H01M 50/182 429/164 |
| 2010/0305629 A1 | 12/2010 | Lund et al. |
| 2011/0117404 A1 | 5/2011 | Moceri et al. |
| 2011/0183181 A1 | 7/2011 | Moon et al. |
| 2015/0221898 A1* | 8/2015 | Chi ....................... H01M 4/405 29/623.2 |
| 2017/0155097 A1 | 6/2017 | Kang et al. |
| 2020/0083492 A1 | 3/2020 | Koshiol et al. |

FOREIGN PATENT DOCUMENTS

| | | |
|---|---|---|
| CN | 112689924 A | 4/2021 |
| JP | 2000138045 A | 5/2000 |
| WO | WO-2020055745 A1 | 3/2020 |

OTHER PUBLICATIONS

"U.S. Appl. No. 16/564,996, Final Office Action dated Aug. 9, 2021", 14 pgs.
"U.S. Appl. No. 16/564,996, Non Final Office Action dated Feb. 24, 2021", 11 pgs.
"U.S. Appl. No. 16/564,996, Non Final Office Action dated Nov. 19, 2021", 6 pgs.
"U.S. Appl. No. 16/564,996, Notice of Allowance dated May 20, 2022", 10 pgs.
"U.S. Appl. No. 16/564,996, Response filed Feb. 16, 2021 to Restriction Requirement dated Dec. 16, 2020", 5 pgs.
"U.S. Appl. No. 16/564,996, Response filed Feb. 21, 2022 to Non Final Office Action dated Nov. 19, 2021", 5 pgs.
"U.S. Appl. No. 16/564,996, Response filed May 24, 2021 to Non Final Office Action dated Feb. 24, 2021", 7 pgs.
"U.S. Appl. No. 16/564,996, Response filed Oct. 11, 2021 to Final Office Action dated Aug. 9, 2021", 8 pgs.
"U.S. Appl. No. 16/564,996, Restriction Requirement dated Dec. 16, 2020", 7 pgs.
"European Application Serial No. 19773627.5, Response filed Jun. 24, 2021 to Communication pursuant to Rules 161 (1) and 162 EPC dated May 3, 2021", 21 pgs.
"International Application Serial No. PCT/US2019/050206, International Preliminary Report on Patentability dated Mar. 25, 2021", 8 pgs.
"International Application Serial No. PCT/US2019/050206, International Search Report dated Dec. 2, 2019", 4 pgs.
"International Application Serial No. PCT/US2019/050206, Written Opinion dated Dec. 2, 2019", 6 pgs.
"Chinese Application Serial No. 201980060108.0, Office Action dated Jan. 31, 2023", with English Translation, 15 pgs.
"Chinese Application Serial No. 201980060108.0, Office Action dated Aug. 3, 2022", with English Translation, 23 pgs.
"Chinese Application Serial No. 201980060108.0, Response filed Apr. 11, 2023 to Office Action dated Jan. 31, 2023", w/ English Claims, 12 pgs.
"Chinese Application Serial No. 201980060108.0, Response filed Dec. 7, 2022 to Office Action dated Aug. 3, 2022", w/ English Claims, 15 pgs.

\* cited by examiner

OPEN TUBE BATTERY HOUSING

CLAIM OF PRIORITY

This application is a divisional of U.S. patent application Ser. No. 16/564,996, filed on Sep. 9, 2019, which claims the benefit of priority under 35 U.S.C. § 119(e) of U.S. Provisional Patent Application Ser. No. 62/730,029, filed on Sep. 12, 2018, which are herein incorporated by reference in their entireties.

FIELD

The present invention concerns implantable medical devices, and more specifically to a battery for such devices.

BACKGROUND

The basic components that make up a battery are an anode, a cathode, a separator between the anode and the cathode, electrolyte, and packaging hardware such as the battery case.

It is desirable to improve the packaging efficiency of the battery particularly for medical implantable devices, since this will provide a smaller battery. Also, consistency from one battery to the next is a desirable feature for implantable medical devices. A heightened consistency allows the battery's life-cycle to be predictable. Thus, more robust, manufacturable designs for batteries are needed.

OVERVIEW

Example 1 can include subject matter that can include a battery having a battery case including a housing having side walls defining a first open end and a second open end, the battery case including a separate top cover to cover the first open end of the housing and a separate bottom cover to cover the second open end of the housing; a first electrode located within the case; a second electrode located within the case; a first terminal coupled to the first electrode and exposed outside the case; and a second terminal coupled to the second electrode and exposed outside the case.

In Example 2, the subject matter of Example 1 can optionally include the first electrode being attached to the inner surface of the side walls of the housing.

In Example 3, the subject matter of any of Examples 1-2 can optionally include the first electrode including lithium.

In Example 4, the subject matter of any of Examples 1-3 can optionally include the housing acting as the current collector for the first electrode.

In Example 5, the subject matter of any of Examples 1-4 can optionally include the first terminal being coupled to the case and the second terminal including a feedthrough which is insulated from the case.

In Example 6, the subject matter of Example 5 can optionally include the second electrode including a current collector coupled to the feedthrough and active electrode material around the current collector and the battery further including a separator bag covering a bottom and side surfaces of the second electrode with a top surface of the second electrode exposed toward the top cover.

In Example 7, the subject matter of Example 6 can optionally include a ribbon connector attached to and folded between the current collector and the feedthrough.

In Example 8, the subject matter of Example 1 can optionally include the first terminal including a first feedthrough which is insulated from the case and extends through the top cover and the second terminal including a second feedthrough which is insulated from the case and extends through the bottom cover.

In Example 9, the subject matter of any of Examples 1-8 can optionally include the housing being cylindrical.

In Example 10, the subject matter of any of Examples 1-8 can optionally include the housing being rectangular.

Example 11 can include subject matter that can include a method of assembling a battery including: laminating a first electrode material directly to an inner surface of a battery housing having side walls defining a first open end and a second open end; inserting a second electrode assembly into the housing, attaching a top cover to the housing over the first open end; attaching a first terminal to the top cover and electrically coupled to the first electrode; attaching a second terminal to the second electrode assembly, the second terminal being insulated from the housing and the top cover; and attaching a bottom cover to the housing over the second open end.

In Example 12, the subject matter of Example 11 can optionally include wherein laminating includes bonding a sheet of lithium to the inner surface by using a rolling pin extending through both the first open end and second open end of the housing.

In Example 13, the subject matter of Example 12 can optionally include wherein laminating includes partially covering the inner surface of the housing such that there is no first electrode material adjacent either the first open end or the second open end of the housing.

In Example 14, the subject matter of any of Examples 11-13 can optionally include wherein the second electrode assembly includes a current collector coupled to the second terminal and active electrode material around the current collector and a separator bag covering bottom and side surfaces of the active electrode material.

In Example 15, the subject matter of any of Examples 11-14 can optionally include wherein before the bottom cover is attached, the inner components of the battery are inspected.

Example 16 can include subject matter that can include a battery including: a battery case including a housing having side walls defining a first open end and a second open end, the battery case including a separate top cover to cover the first open end of the housing and a separate bottom cover to cover the second open end of the housing; a first electrode located within the case; a second electrode located within the case; a first terminal coupled to the first electrode and exposed outside the case; and a second terminal coupled to the second electrode and exposed outside the case.

In Example 17, the subject matter of Example 16 can optionally include the first electrode being attached to the inner surface of the side walls of the housing.

In Example 18, the subject matter of any of Examples 16-17 can optionally include the first electrode including lithium.

In Example 19, the subject matter of any of Examples 16-18 can optionally include the housing acting as the current collector for the first electrode.

In Example 20, the subject matter of Example 19 can optionally include the first terminal being coupled to the case and the second terminal including a feedthrough which is insulated from the case.

In Example 21, the subject matter of Example 20 can optionally include the second electrode including a current collector coupled to the feedthrough and active electrode material around the current collector and the battery further including a separator bag covering a bottom and side surfaces of the second electrode with a top surface of the second electrode exposed toward the top cover.

In Example 22, the subject matter of Example 21 can optionally include a ribbon connector attached to and folded between the current collector and the feedthrough.

In Example 23, the subject matter of any of Examples 16-22 can optionally include the first terminal including a first feedthrough which is insulated from the case and extends through the top cover and the second terminal includes a second feedthrough which is insulated from the case and extends through the bottom cover.

Example 24 can include subject matter that can include a battery comprising: a battery case including a housing having side walls defining a first open end and a second open end, the battery case including a separate top cover to cover the first open end of the housing and a separate bottom cover to cover the second open end of the housing; a first electrode attached to the inner surface of the side walls of the housing; a second electrode located within the case; a first terminal coupled to the case and exposed outside the case; and a second terminal coupled to the second electrode and exposed outside the case, the second terminal including a feedthrough which is insulated from the case.

In Example 25, the subject matter of Example 24 can optionally include the first electrode including lithium.

In Example 26, the subject matter of any of Examples 24-25 can optionally include the housing acting as the current collector for the first electrode.

In Example 27, the subject matter of any of Examples 24-26 can optionally include the second electrode including a current collector coupled to the feedthrough and active electrode material around the current collector and the battery further including a separator bag covering a bottom and side surfaces of the second electrode with a top surface of the second electrode exposed toward the top cover.

In Example 28, the subject matter of Example 27 can optionally include a ribbon connector attached to and folded between the current collector and the feedthrough.

In Example 29, the subject matter of any of Examples 24-28 can optionally include the housing being cylindrical.

In Example 30, the subject matter of any of Examples 24-29 can optionally include wherein the housing is rectangular.

Example 31 can include subject matter that can include a method of assembling a battery comprising: laminating a first electrode material directly to an inner surface of a battery housing having side walls defining a first open end and a second open end; inserting a second electrode assembly into the housing, attaching a top cover to the housing over the first open end; attaching a first terminal to the top cover and electrically coupled to the first electrode; attaching a second terminal to the second electrode assembly, the second terminal insulated from the housing and the top cover; and attaching a bottom cover to the housing over the second open end.

In Example 32, the subject matter of Example 31 can optionally include wherein laminating includes bonding a sheet of lithium to the inner surface by using a rolling pin extending through both the first open end and second open end of the housing.

In Example 33, the subject matter of Example 32 can optionally include wherein laminating includes partially covering the inner surface of the housing such that there is no first electrode material adjacent either the first open end or the second open end of the housing.

In Example 34, the subject matter of any of Examples 31-33 can optionally include wherein the second electrode assembly includes a current collector coupled to the second terminal and active electrode material around the current collector and a separator bag covering bottom and side surfaces of the active electrode material.

In Example 35, the subject matter of any of Examples 31-34 can optionally include wherein before the bottom cover is attached, the inner components of the battery are inspected.

These examples can be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Batteries designed as discussed below can be used for a variety of different purposes. One purpose for such batteries is in implantable medical devices for example. It is desirable in such a case the batteries have as small a size as possible while maximizing the stored energy.

Figure 1:
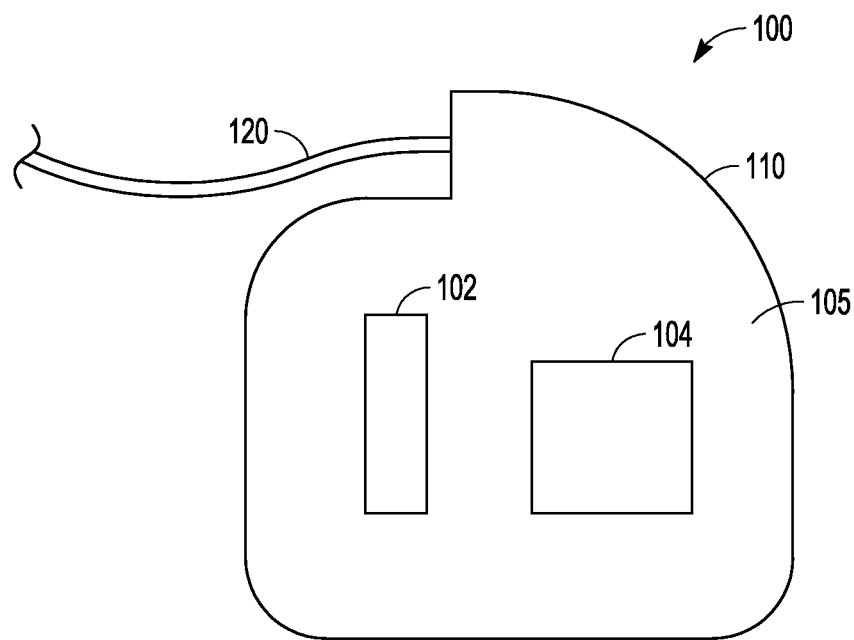
FIG. 1 shows an implantable medical device, in accordance with one embodiment.

FIG. 1 shows an implantable system 100 which can use such a battery, in accordance with one embodiment. The implantable system 100 includes a pulse generator 105 and at least one lead 120. The pulse generator 105 includes a housing 110. The pulse generator 105 can be implanted into a subcutaneous pocket made in the wall of a patient's chest. Alternatively, the pulse generator 105 can be placed in a subcutaneous pocket made in the abdomen, or in other locations. Pulse generator 105 can include a power supply such as a battery 102, a capacitor, and other components 104 housed in the housing 110. The pulse generator 105 can include microprocessors to provide processing, evaluation, and to deliver electrical shocks and pulses of different energy levels and timing for defibrillation, cardioversion, and pacing to a heart in response to cardiac arrhythmia including fibrillation, tachycardia, heart failure, and bradycardia.

In other embodiments, implantable system 100 can also be suitable for use with implantable electrical stimulators, such as, but not limited to, neuro-stimulators, skeletal stimulators, central nervous system stimulators, or stimulators for the treatment of pain. In some examples, the system can be used for diagnostic devices such as cardiac monitors.

The lead 120 includes a lead body having a proximal end, where a terminal of the lead can be coupled to a header of the pulse generator 105. The lead 120 extends to a distal end, which can be coupled with a portion of a heart, when implanted. The distal end of the lead 120 includes at least one electrode which electrically couples the lead 120 with the heart. At least one electrical conductor is disposed within the lead 120 and extends from the proximal end to the electrode. The electrical conductor carries electrical currents and signals between the pulse generator 105 and the electrode.

Since pulse generator 105 is typically implanted in the left region of the chest or in the abdomen, a smaller size device, which is still capable of delivering the required level of electrical energy, is desirable.

Figure 2:
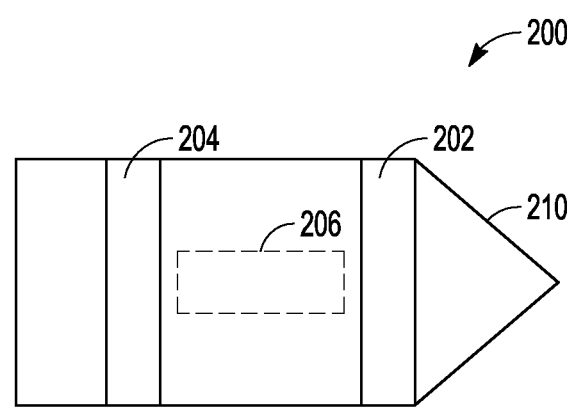
FIG. 2 shows a schematic view of an implantable medical device, in accordance with one embodiment.

FIG. 2 shows a schematic view of an implantable medical device 200 which can also use such a battery, in accordance with one embodiment. Medical device 200 is a wireless, implantable electrode. Since no leads are involved, the device needs its own power to develop a charge. Device 200 includes a housing 210 which includes electrodes 202 and 204 and encloses a battery 206, which can be formed using one or more features discussed below. In another example, the battery 206 can be integrated as part of the housing of device 200 and thus be in contact with the device housing rather than isolated inside the device 200.

Figure 3:
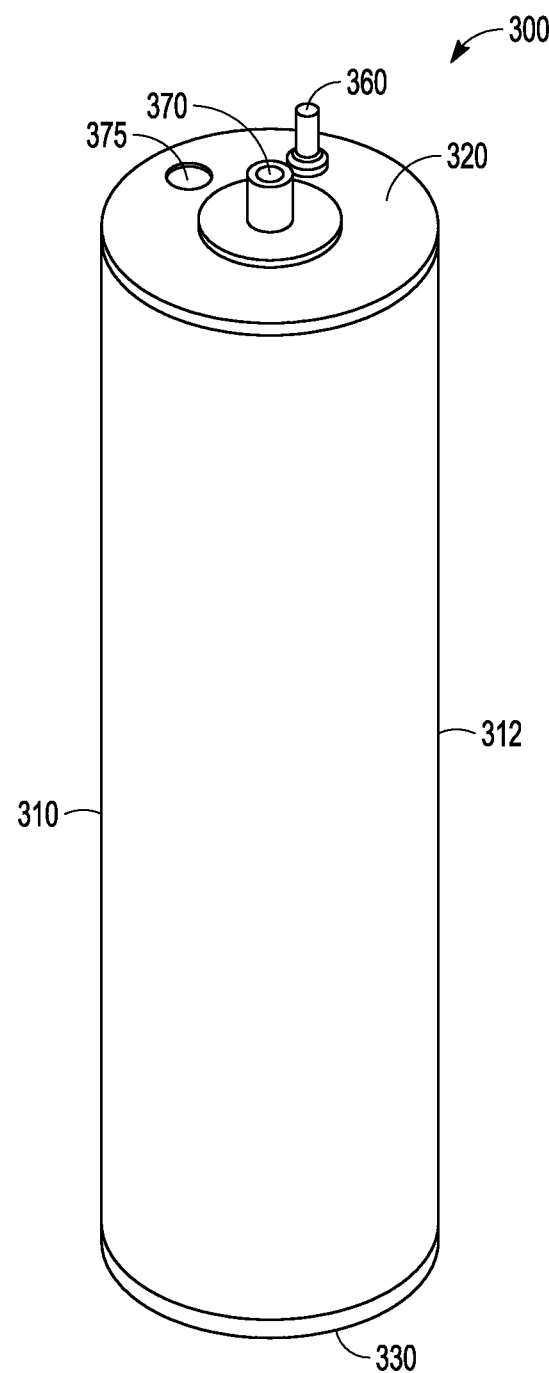
FIG. 3 shows an isometric view of a battery, in accordance with one embodiment.

FIG. 3 shows an isometric view of a battery 300, in accordance with one embodiment. The battery 300 can be useful in devices such as the implantable devices described above for the reason detailed below. Here, the battery 300 generally includes a battery case 310 including a housing 312 having side walls defining a first open end and a second open end, as will be discussed below. The battery case 310 includes a separate top cover 320 to cover the first open end of the housing 312 and a separate bottom cover 330 to cover the second open end of the housing 312. The case 310 encloses the first and second electrodes. In one embodiment, a first terminal 360 is coupled to the first electrode and exposed outside the case 310, and a second terminal 370 is coupled to the second electrode and exposed outside the case 310. In one embodiment, a backfill hole 375 is provided in the top cover 320 to backfill electrolyte in the battery.

Figure 4:
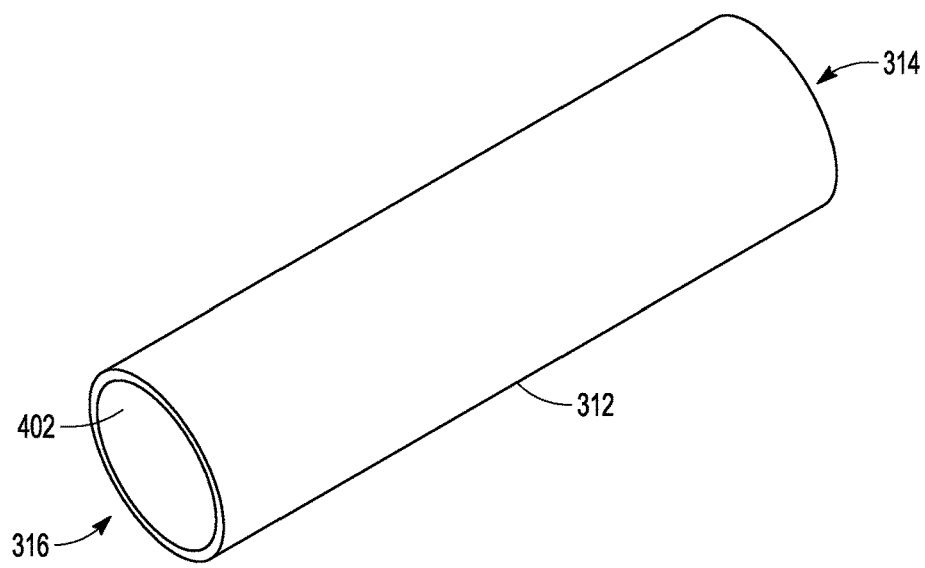
FIG. 4 shows a housing for a battery, in accordance with one embodiment.

FIG. 4 shows the housing 312 for the battery 300, in accordance with one embodiment. The housing 312 is a metallic housing including side walls defining a first open end 314 and a second open end 316. In this example, the housing 312 is a cylindrical tube that is open on both ends which provides ease of access to the inner surface 402 of the housing 312. The tubular housing 312 can be manufactured using many metal fabrication processes including but not limited to extrusion and machining. In one example, the housing 312 can have a diameter of about 0.125 inches. In other embodiments, the housing 312 can have a diameter of about 0.125 inches or higher.

Figure 5:
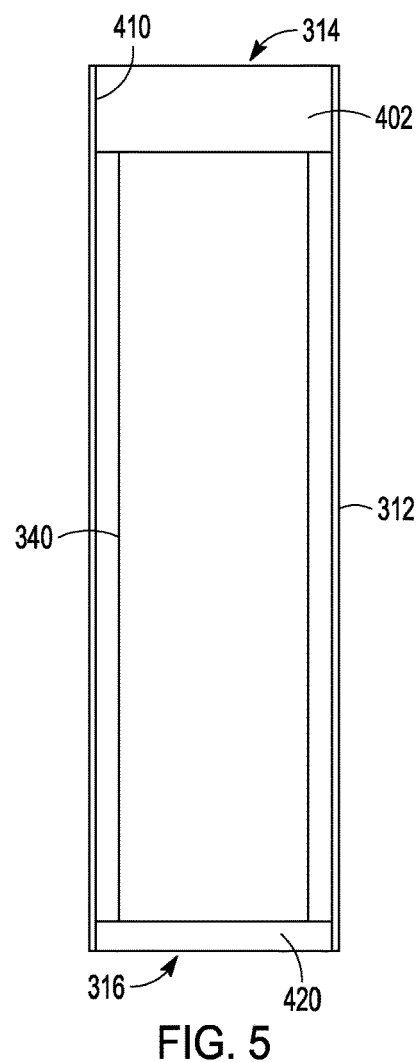
FIG. 5 shows a cross section of a portion of a battery in accordance with one embodiment.

FIG. 5 shows a cross section of a portion of the battery 300 during manufacture, in accordance with one embodiment. In this example, a first electrode 340 material is laminated and bonded directly to the inner surface 402 of the housing 312. In one example, the first electrode 340 can include lithium to form an anode electrode.

To attach the lithium to the inner surface 402, the laminating process includes bonding a sheet of lithium to the inner surface 402 by using a rolling pin extending through both the first open end 314 and second open end 316 of the housing 312. By providing an open-ended housing 312, the rolling pin can supply sufficient pressure to bond the lithium to the inner surface 402. If a typical "can" battery housing is used, such pressure cannot be applied. In other examples, the lithium can be laminated to the inner surface using a pressurized balloon, an expanding plunger, other or methods.

In this example, the housing 312 acts as the current collector for the first electrode 340. Thus, a separate current collector is not needed and there does not need to be a separate connector between the current collector of the first electrode 340 and the terminal. By eliminating a discrete current collector and eliminating an interconnect between the discrete current collector and a terminal, valuable space can be saved.

In some embodiments, a cathode material can be pressed against the inner surface 402 of the housing to make a case positive design. Such cathode designs may require adhesion promoters such as carbon to improve the bond from the cathode to the inner surface 402.

In some embodiments, another electrode material can be attached to the inner surface, but an interconnect between the electrode material and the housing wall may need to be provided.

As shown in FIG. 5, there is a first bare space 402 at the first open end 314 where no electrode material for the electrode 340 is applied to the housing 312. Likewise, there is a second bare space 420 at the second open end 316 of the housing 312. Again, using the open-ended housing 312 allows use of alignment tools for precise placement of the electrode 340 material so that tight tolerances need for very small batteries can be reached. The open-ended design also allows for close inspection at each end to ensure the electrode 340 material is positioned precisely.

Figure 6:
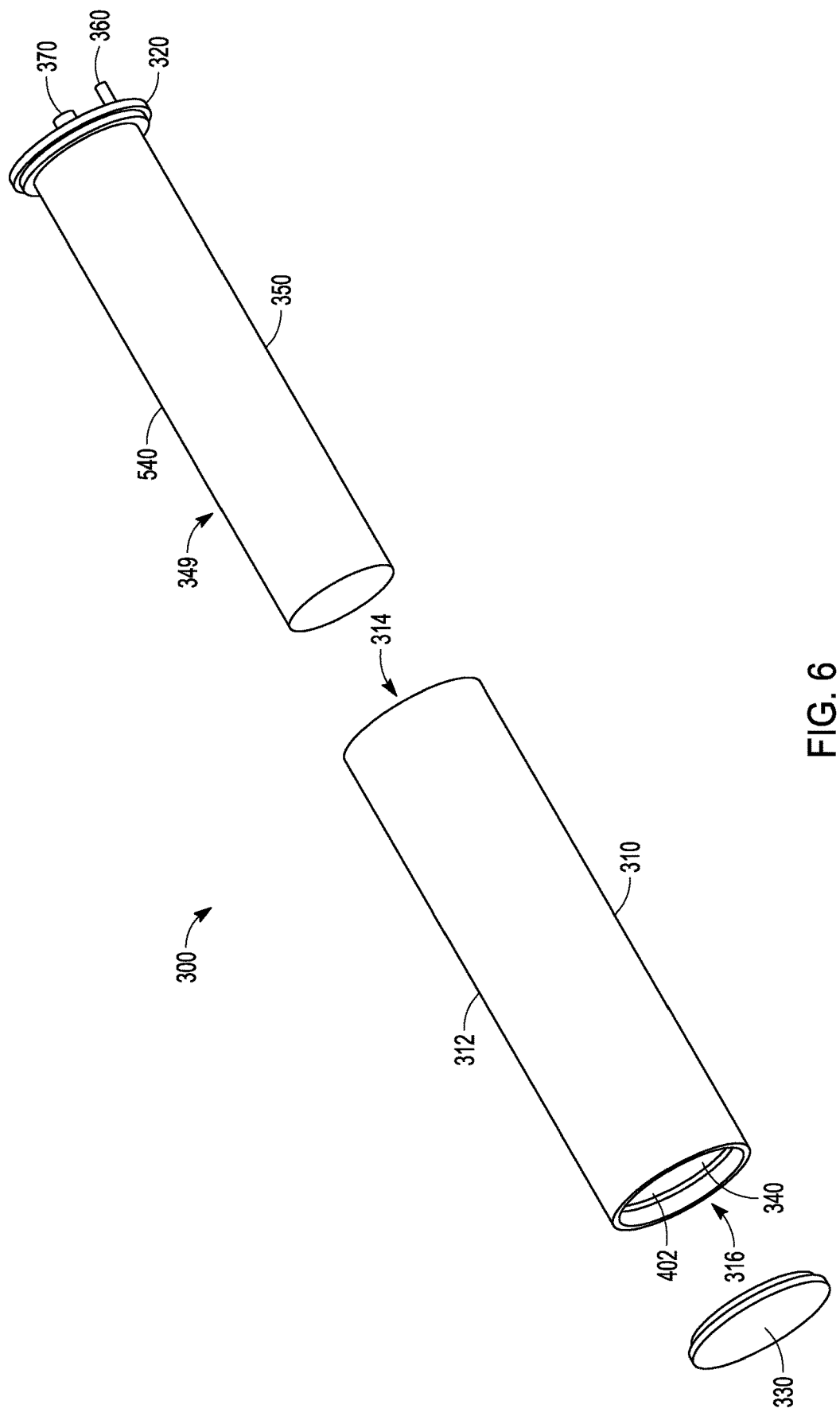
FIG. 6 shows an exploded view of a battery, in accordance with one embodiment.

FIG. 6 shows an exploded view of the battery 300, in accordance with one embodiment. Here, the housing 312 with the first electrode 340 attached thereto as discussed above is shown. A second electrode assembly 349 includes a second electrode 350 which is enclosed in a separator bag 540. The top cover 320 can be already attached to the second electrode assembly 349, as will be further discussed below. On the top cover 320 are the first terminal 360 which is directly attached to the top cover 320 and the second terminal 370 which extends through the top cover 320 and is insulated from the top cover 320. The entire second electrode assembly 349 can be slipped inside the housing 312. The open-ended housing design of battery 300 allows for precise positioning of the parts. The additional access of the open ends permits more precise component placement by allowing counter force and the use of a hard stop at the bottom open end to precisely locate the second electrode assembly 349 within the housing 312. Moreover, the two open ends also allow for inspection after component placement to ensure no damage was incurred during the assembly process.

The bottom and top covers 330, 320 can be welded to the housing 312. When the top cover 320 is welded to the housing 312, the terminal 360 is then electrically connected to the first electrode 340.

Figure 7:
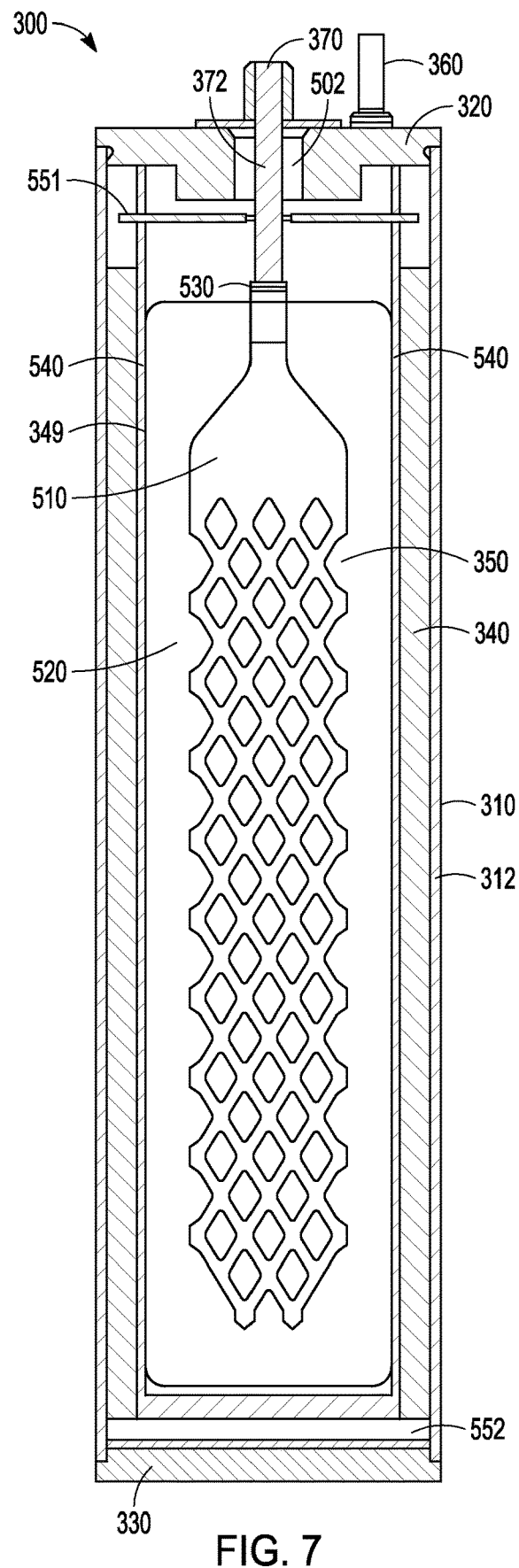
FIG. 7 shows a cross section of a battery in accordance with one embodiment.
Figure 8:
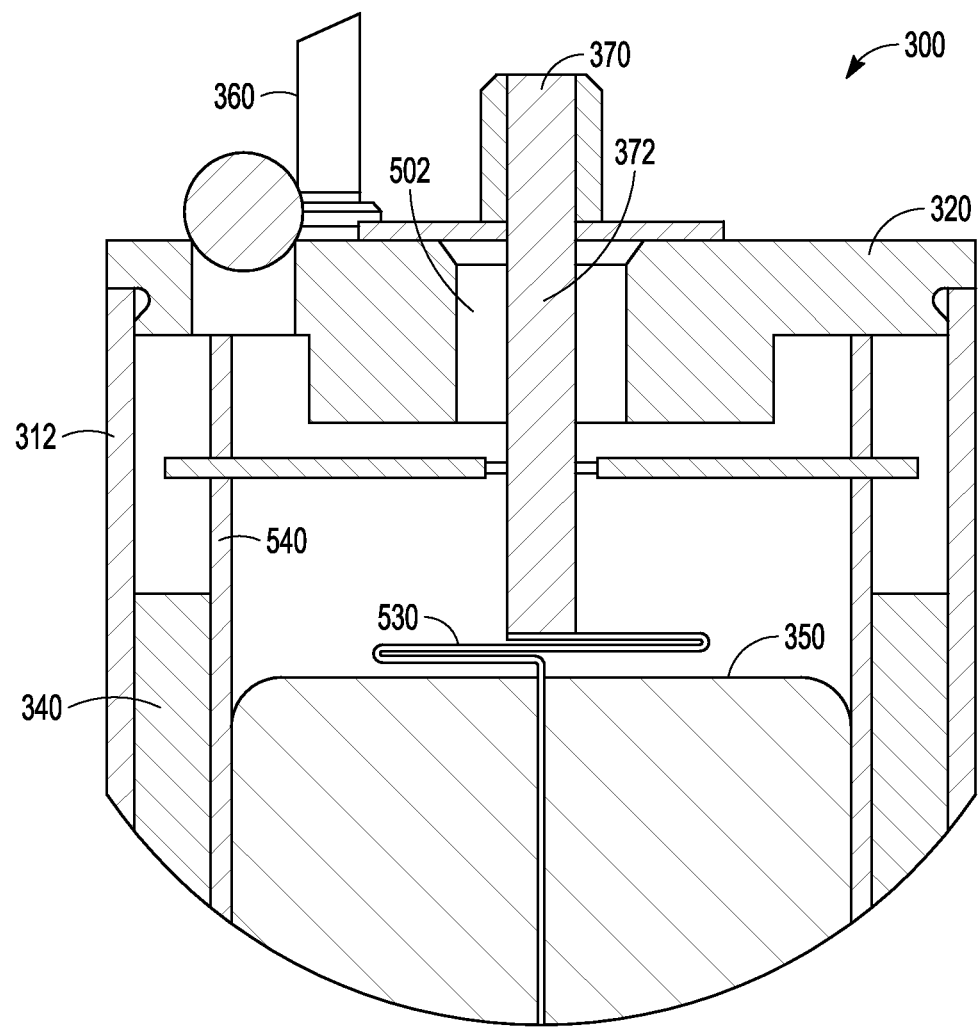
FIG. 8 shows a cross-section of a portion of a battery, in accordance with one embodiment.

FIG. 7 shows a cross section of the assembled battery 300, in accordance with one embodiment, and FIG. 8 shows a cross-section of the top portion of the battery 300. FIG. 8 is a side view of the view of FIG. 7.

After assembly, the electrodes 350, 340 are aligned such that the second electrode 350 does not reach either end of the first electrode 340. The separator bag 540 goes all the way up to a bottom surface of the top cover 320. There is a small gap 552 between the separator bag 540 and the bottom cover 330. This is created during assembly when a pin is inserted into the second open end 316 to provide a hard stop as the cathode assembly is inserted into the housing 312.

The first terminal 360 is coupled to the case 310 and the second terminal 370 includes a feedthrough 372 which is insulated from the case 310 by an insulator 502 which insulates between the feedthrough 372 and the top cover 320. Feedthrough insulator tape 551 is position just below the top cover 320.

Here, the second electrode 350 includes a current collector 510 coupled to the feedthrough 372 and active electrode material 520 around the current collector 510. As part of the second electrode assembly 349, the separator bag 540 covers a bottom and side surfaces of the second electrode 350 with a top surface of the second electrode 350 exposed toward the top cover 320.

A ribbon connector 530 can be attached to and folded between the current collector 510 of the electrode 350 and the feedthrough 372. Other embodiments omit the ribbon connector 530 and the feedthrough 372 is directly connected to the current collector 510.

Figure 9:
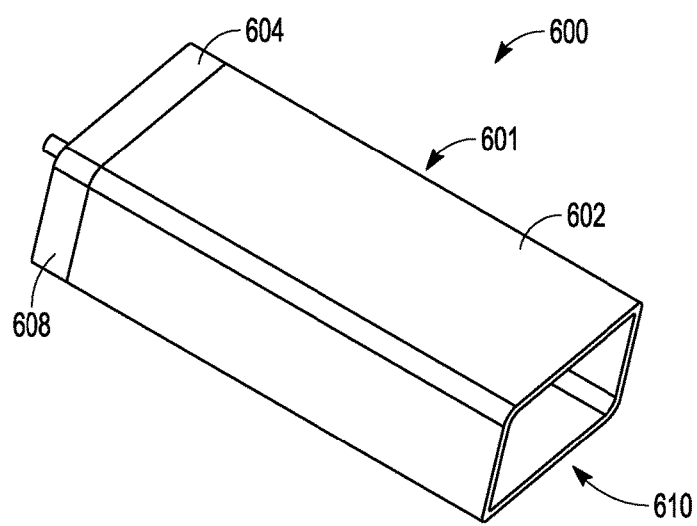
FIG. 9 shows a battery in accordance with one embodiment.

FIG. 9 shows a battery 600 in accordance with one embodiment. In this example, instead of a cylindrical housing, the battery 600 includes a battery case 601 including a rectangular housing 602 having side walls defining a first open end 608 and a second open end 610. The battery case 601 includes a separate top cover 604 to cover the first open end 608 of the housing 602 and a separate bottom cover (not shown) to cover the second open end 610 of the housing 602. Other features as discussed above are also applicable to the battery 600. For instance, battery housing 602 allows for inspection and tight control of tolerances at both ends of the battery 600. The rectangular housing 602 can be useful for battery stack designs where there are a plurality of stacked or wound electrodes. The open end allows for pulling (instead of pushing) the stack into the housing. This helps avoid damaging thin electrodes. Also, the electrode tabs of the stack can be welded through the bottom open end.

Figure 10:
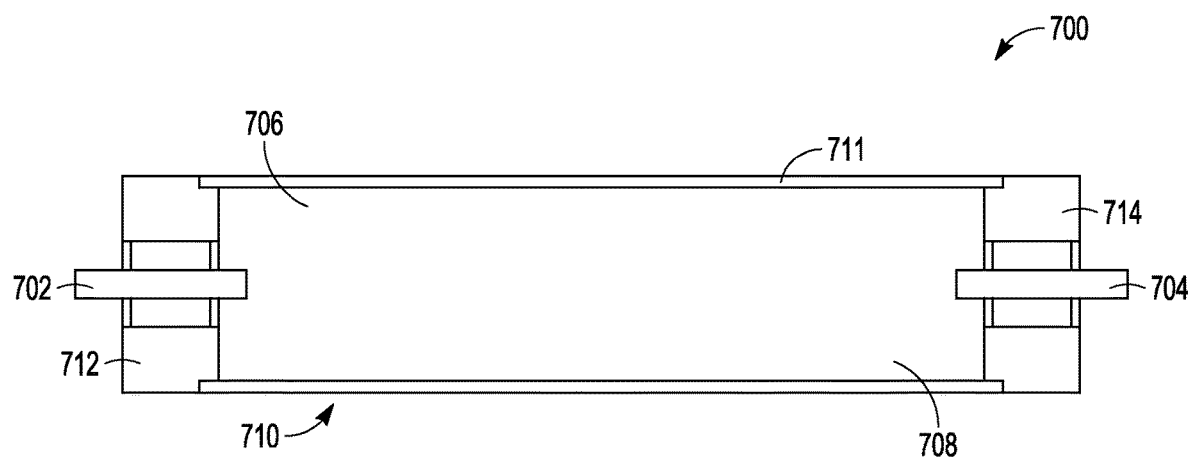
FIG. 10 shows a battery in accordance with one embodiment.

FIG. 10 shows a battery 700 in accordance with one embodiment. Battery 700 is a case neutral, very small diameter cell especially useful for the wireless, implantable electrode shown in FIG. 2. In this example the battery case diameter can be about 0.100 inches or more.

The battery 700 includes a battery case 710 including a housing 711 having side walls defining a first open end 706 and a second open end 708. The battery case 710 includes a separate top cover 712 to cover the first open end 706 of the housing 711 and a separate bottom cover 714 to cover the second open end 708 of the housing 711. Not shown for ease of example, but as discussed above for battery 300, there can be first and second electrodes within the case 710. Here, a first terminal 702 includes a first feedthrough which is insulated from the case 710 and extends through the top cover 712 and a second terminal 704 includes a second feedthrough which is insulated from the case 710 and extends through the bottom cover 714. Other design details and assembly are similar to battery 300 discussed above.

Referring to battery 300 of FIGS. 3-8, the assembly of the battery 300 can include laminating the first electrode 340 material directly to the inner surface of the battery housing 312 having first and second open ends 314, 316. The assembly can include inserting a second electrode assembly 349 into the housing 312 and positioning the second electrode using counterforce and hard stops if needed. The top cover 320 is then attached to the housing 312 over the first open end 314. After any necessary inspection of positioning and connections, the bottom cover 330 is attached to the housing 312 over the second open end 316, and electrolyte can be backfilled into the battery.

As noted above, laminating can include bonding a sheet of lithium to the inner surface of the housing 312 by using a rolling pin extending through both the first open end and second open end of the housing 312. The laminating is precisely controlled so that the electrode material partially covers the inner surface 402 of the housing 312 such that there is no first electrode material adjacent either the first open end 314 or the second open end 316 of the housing 312. Instead, there are the bare space 410, 420 at each of the open ends.

In one example, the second electrode assembly 349 can be pre-assembled and includes the current collector 510 with the active electrode 350 material around the current collector 510 and the separator bag 540 covering the bottom and side surfaces of the active electrode material 350. The second electrode assembly can be attached the top cover 320 by attaching the ribbon connector 530 between the second terminal 370 (which is insulated from the top cover 320) and the current collector 510. The separator bag 540 extends all the way up to the top cover 320. This entire electrode assembly can then be slipped into the housing containing the first electrode 340 material.

As noted above, the open-ended battery housings discussed herein allow access for assembly operations into the battery housing. Providing access on both ends allows for the elimination of some non-active battery materials/components, such as eliminating a current collector and interconnects for the electrode 340. This enables a more volumetrically efficient and manufacturable design.

In general, the present concept is attractive in very small (<1 cc) cells where volume and access inside the housing is extremely limited. For example, in some embodiments, the batteries discussed above can have a diameter of about 0.100 inches. In some embodiments, the batteries discussed above can have a diameter of about 0.125 inches. In some embodiments, the diameter can range from 0.125 inches or higher. These very small diameters create manufacturing difficulties, but the ability to access both ends for assembly, interconnections, and inspections creates a more robust, manufacturable design. Moreover, this style of battery housing can be beneficial regardless of cell chemistry, including primary and secondary chemistries.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method of assembling a battery comprising:
    laminating a first electrode material directly to an inner surface of a battery housing having side walls defining a first open end and a second open end;
    inserting a second electrode assembly into the battery housing,
    attaching a top cover to the battery housing over the first open end;
    attaching a first terminal to the top cover such that the first terminal is electrically coupled to the first electrode material;
    attaching a second terminal to the second electrode assembly, the second terminal insulated from the battery housing and the top cover; and
    attaching a bottom cover to the battery housing over the second open end.

2. The method of claim 1, wherein laminating includes bonding a sheet of lithium to the inner surface by using a rolling pin extending through both the first open end and second open end of the battery housing.

3. The method of claim 2, wherein laminating includes partially covering the inner surface of the battery housing such that there is a bare space on the inner surface of the battery housing with no first electrode material at both the first open end and the second open end of the battery housing.

4. The method of claim 1, wherein the second electrode assembly includes a current collector coupled to the second terminal and active electrode material around the current collector and a separator bag covering bottom and side surfaces of the active electrode material.

5. The method of claim 1, wherein laminating the first electrode material to the inner surface of the battery housing includes laminating the first electrode material to the side walls of the battery housing such that the first electrode material defines a hollow core within the first electrode material, the hollow core having a cross-sectional shape in a plane perpendicular to a longitudinal axis of the hollow core which is the same as a cross-sectional shape of the battery housing in a plane perpendicular to a longitudinal axis of the battery housing.

6. The method of claim 5, wherein the second electrode assembly is positioned within the hollow core.

7. The method of claim 1, wherein the battery housing acts as a current collector for the first electrode material.

8. The method of claim 1, wherein the first terminal is coupled to the battery housing and the second terminal includes a feedthrough which is insulated from the battery housing.

* * * * *